United States Patent
Haywood

(10) Patent No.: US 12,258,968 B2
(45) Date of Patent: Mar. 25, 2025

(54) MECHANICAL SEAL ASSEMBLY WITH DOUBLE-SEALING PROPERTIES AND LOW PRESSURE AREA

(71) Applicant: FSI NORTH AMERICA, INC., Coraopolis, PA (US)

(72) Inventor: William Haywood, Monongahela, PA (US)

(73) Assignee: FSI North America, Inc., Coraopolis, PA (US)

( * ) Notice: Subject to any disclaimer, the term of this patent is extended or adjusted under 35 U.S.C. 154(b) by 0 days.

(21) Appl. No.: 18/337,903

(22) Filed: Jun. 20, 2023

(65) Prior Publication Data

US 2023/0407868 A1  Dec. 21, 2023

Related U.S. Application Data

(60) Provisional application No. 63/353,887, filed on Jun. 21, 2022.

(51) Int. Cl.
| | |
|---|---|
| *F16J 15/3256* | (2016.01) |
| *F04C 27/00* | (2006.01) |
| *F16J 15/324* | (2016.01) |

(52) U.S. Cl.
CPC ........... *F04C 27/009* (2013.01); *F16J 15/324* (2013.01); *F16J 15/3256* (2013.01)

(58) Field of Classification Search
CPC .... F04C 27/009; F16J 15/324; F16J 15/3256; F16J 15/34
See application file for complete search history.

(56) References Cited

U.S. PATENT DOCUMENTS

| | | |
|---|---|---|
| 3,877,706 A | 4/1975 | Haas et al. |
| 4,538,820 A | 9/1985 | Duffee |
| 4,576,384 A | 3/1986 | Azibert |
| 4,872,689 A | 10/1989 | Drumm |
| 5,114,163 A | 5/1992 | Radosav et al. |
| 5,116,066 A | 5/1992 | Crawford |
| 5,275,421 A | 1/1994 | Hornsby |
| 5,356,158 A | 10/1994 | Simmons et al. |
| 5,370,401 A | 12/1994 | Sandgren |
| 5,490,682 A | 2/1996 | Radosav et al. |
| 5,662,340 A | 9/1997 | Bessett et al. |
| 5,716,054 A | 2/1998 | Duffee et al. |
| 5,961,122 A | 10/1999 | Marsi |
| 6,017,036 A | 1/2000 | Murphy |
| 6,412,784 B1 | 7/2002 | Cohen |

(Continued)

*Primary Examiner* — Gilbert Y Lee
(74) *Attorney, Agent, or Firm* — McNees Wallace & Nurick

(57) ABSTRACT

A mechanical seal of the cartridge type. A rotary subassembly includes a sleeve, the sleeve packed against and adapted to be in sealing disposition with a pump shaft of a pump. A stationary subassembly is for attachment to a stuffing box of the pump, the stationary subassembly including a gland, the gland having a front face and a back face and a gland lip extending from the back face. A lip seal is disposed within the gland at the back face below the gland lip, wherein the lip seal concurrently seals and acts as a secondary lubricant within the seal. In addition, a scroll is crimped onto said sleeve of the rotary subassembly at the downshaft end thereof, wherein the scroll includes a spirally-arranged, ridged outer surface.

8 Claims, 3 Drawing Sheets

(56) References Cited

U.S. PATENT DOCUMENTS

| | | | |
|---|---|---|---|
| 6,485,024 | B1 | 11/2002 | Pippert et al. |
| 6,557,856 | B1 | 5/2003 | Azibert et al. |
| 7,607,884 | B2 | 10/2009 | Cohen |
| 8,651,494 | B2 | 2/2014 | Dudele |
| 8,764,018 | B2 * | 7/2014 | Schwerdtfeger ......... F16J 15/38 |
| | | | 277/394 |
| 9,617,994 | B2 | 4/2017 | Walters et al. |
| 9,651,157 | B2 | 5/2017 | Dudele |
| 9,841,016 | B2 | 12/2017 | Goncalves |
| 2014/0239598 | A1 * | 8/2014 | Hisada ................... F16J 15/002 |
| | | | 277/394 |
| 2018/0023661 | A1 * | 1/2018 | Early .................... F16C 35/077 |
| | | | 74/572.11 |
| 2021/0033089 | A1 * | 2/2021 | Rutter ................... F04D 29/406 |

* cited by examiner

MECHANICAL SEAL ASSEMBLY WITH DOUBLE-SEALING PROPERTIES AND LOW PRESSURE AREA

CROSS-REFERENCE TO RELATED APPLICATIONS

The present application claims benefit of provisional application Ser. No. 63/353,887, filed Jun. 21, 2022, the contents of which are incorporated herein by reference.

FIELD OF THE INVENTION

The instant invention relates to mechanical seals of the cartridge type, and particularly to seals which have wear-extending properties.

BACKGROUND OF THE INVENTION

Mechanical seals are well known in the field to provide fluid seals between mating surfaces of pumps and other industrial equipment which typically require lubrication.

Mechanical seals are therefore subject to wear and corrosion over time. As such, they require replacement.

To lubricate and cool seal faces, typically seal pots are mounted to the seal, which provide a clean and cool source of fluid to the seal faces, as a result aiding to help prevent wear and damage. Such flushing devices also serve to keep solids away from the seal faces. Herein, the need for seal pots is eliminated and water is conserved because no flushing is necessary, as follows.

In addition, high pressure can increase the friction between the seal faces, leading to more significant wear and tear on the sealing surfaces. Increased wear may reduce the operational life of the mechanical seal and necessitate more frequent maintenance or replacement. High pressure can generate heat due to friction and fluid compression within the seal. In extreme cases, the high pressure can cause deformation or distortion of the seal faces, especially if the material is not adequately chosen or designed for the pressure conditions. Thus, excessive pressure beyond the seal's capabilities can cause extrusion, blowout, or other types of seal failure modes. There is a need then for a retainer feature within a cartridge seal which produces a low pressure area to thereby lessen pressure-induced wear.

SUMMARY OF THE INVENTION

It is the object of this invention to extend the wear of mechanical seals by providing a seal with favorable operating parameters.

It is further an objective to provide a seal which functions as if it were a double seal but which drastically reduces operation failure modes.

It is further an objective to eliminate the need for seal pots and conserve water.

It is further an objective to increase seal life by: (1) allowing for the operation at very low differential pressures; (2) lubricating seal faces using a clean external fluid; and (3) using properties that optimize performance.

Accordingly, comprehended is a mechanical seal (of the cartridge type), comprising: a rotary subassembly, the rotary subassembly including a sleeve, the sleeve packed against and adapted to be in sealing disposition with a pump shaft of a pump; a stationary subassembly for attachment to a stuffing box of the pump, the stationary subassembly including a gland, the gland having a front face and a back face and a gland lip extending from the back face; and, a lip seal disposed within the gland at the back face below the gland lip, wherein the lip seal concurrently seals and acts as a secondary lubricant within the seal. In addition, a scroll crimped onto said sleeve of said rotary subassembly at said downshaft end thereof has a notched surface spirally-arranged on its outer diameter to draw fluid away from the seal faces, thereby drawing a vacuum and creating a low pressure area.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
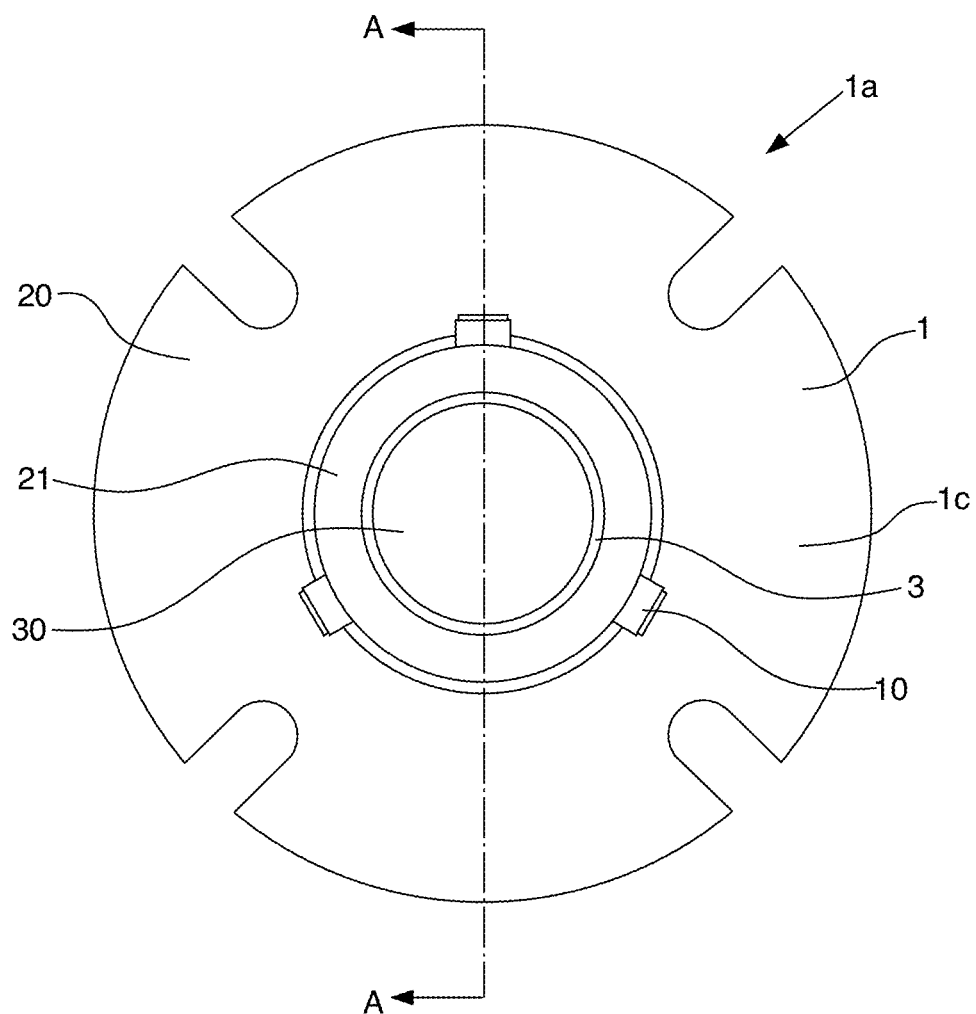
FIG. 1 shows an axial, down-shaft view (in z-y plane) in elevation of the instant seal.
Figure 2:
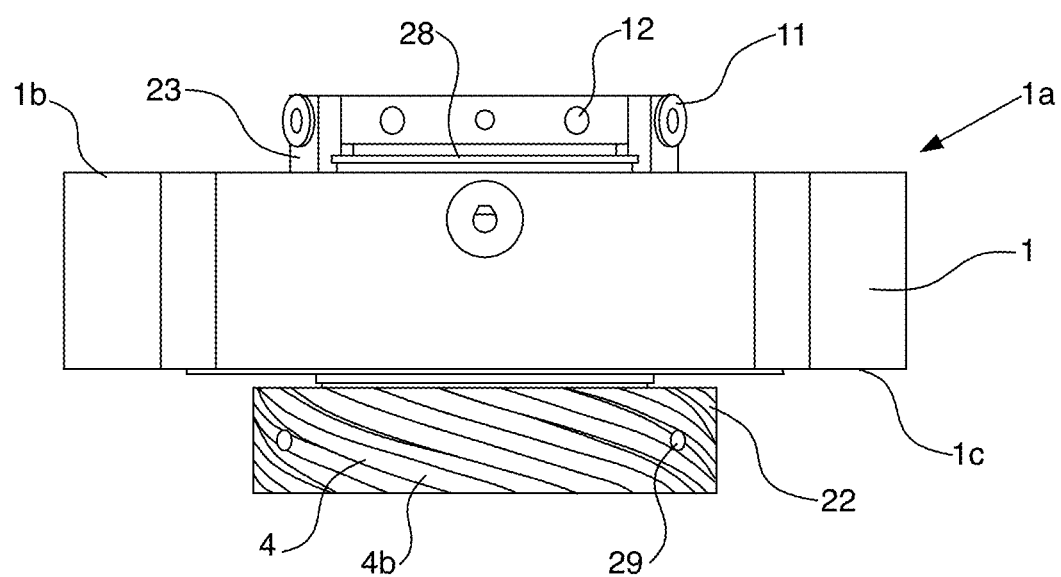
FIG. 2 shows a top-view of the assembly (without the setting clips).
Figure 3:
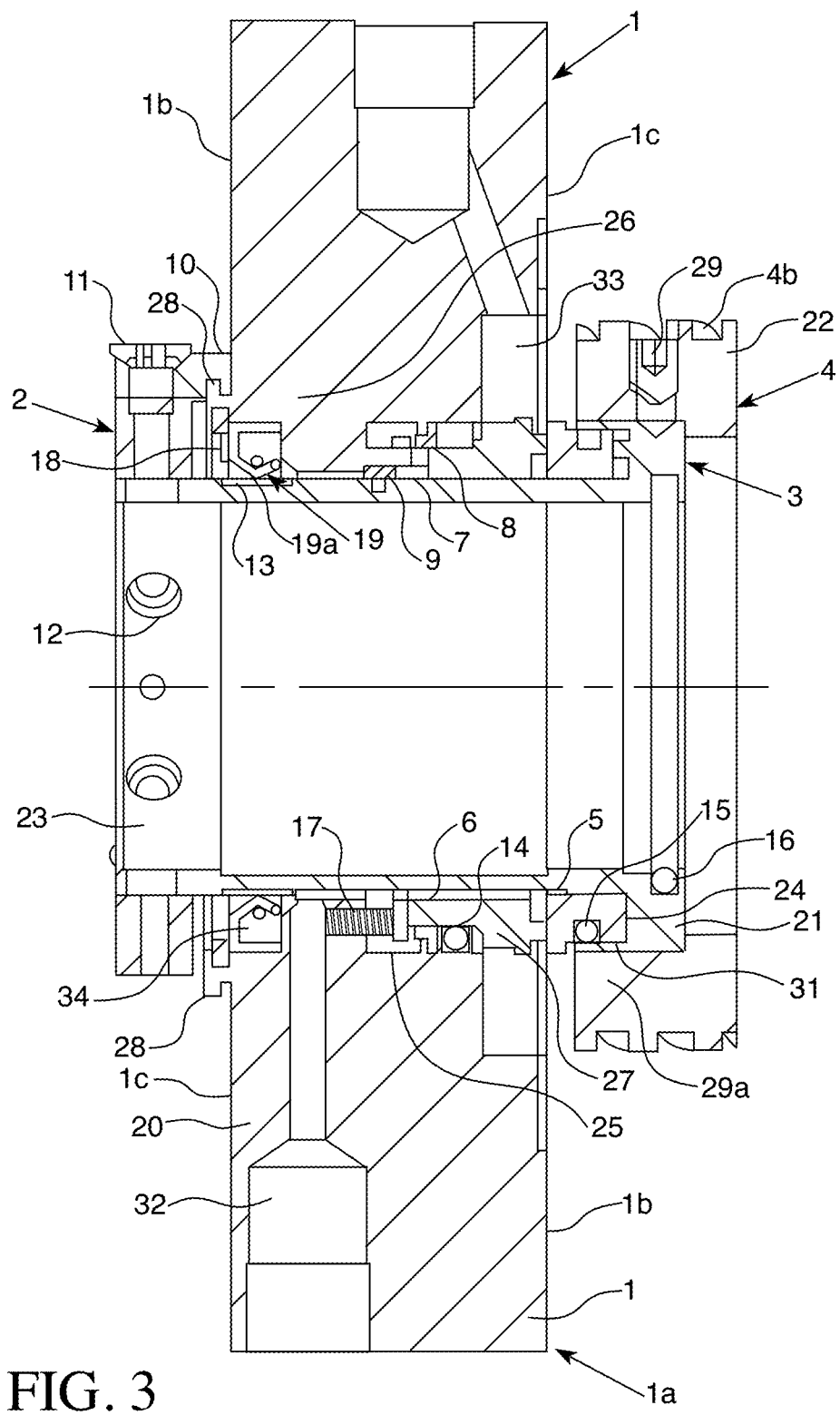
FIG. 3 shows the detail through section A-A of FIG. 1.

Referencing then FIGS. 1-3, shown is the instant seal 1*a* of the cartridge type, it being understood that the seal 1*a* encircles the entire shaft 30, formed as two halves which are set together and components for which would therefore be circumferential (FIG. 3). Accordingly, "a" as used in the claims means one or more. When referenced, 'x' is the axis through shaft 30, the view in FIG. 1 being in the z-y plane and the cross-sectional view in FIG. 3 being thus the x-y plane for instance.

Rotary subassembly 21 is the rotating component of seal 1*a* with pump shaft 30 running against stationary subassembly 20. Rotary subassembly 21 has a downshaft end 22 including end pin 9 and an upshaft end 23 relative to the location of the stuffing box or pump casing, i.e. traveling downshaft means past pump casing into pump. "Stuffing box" means the gland package but may also mean any general casing that would have a packing cavity or box to house the gland 1, the gland 1 thus being within the casing. Therein, L-seat annular 24 is formed at downshaft end 22 to provide a seal at rotary face 5 thereof, which is the flat surface of the rotary subassembly 21 which runs against and thereby forms a seal or barrier between rotary subassembly 21 and stationary subassembly 20. Rotary face 5 and stationary face 6 (below) are each preferably made of solid silicon carbide, tungsten carbide or carbon, thus the instant seal 1*a* has a monolithic design.

Rotary subassembly 21 includes a sleeve 3 packed against and underlying the L-seat annular 24 adapted to be in sealing disposition with the pump shaft 30. An outer surface along sleeve 3 forms part of the boundary of inner seal cavity 25. The sleeve 3 can be coated with a chrome oxide coating to inhibit premature failure. To aid in the seal, a primary o-ring 16 is inverted within the sleeve 3 as shown. "Inverted" means along the shaft-facing side of sleeve 3 such that the primary o-ring 16 is in sealing disposition between shaft 30 and rotary subassembly 21. A secondary o-ring 15 slightly upshaft from primary o-ring 16 is seated within L-seat annular 24 at sealing face 31. A spring 17 abuts stationary seal ring 27, preferably at bottom portion of gland plate 1, to thereby impart an axial load against the stationary seal face 6 in the absence of hydraulic pressure from the pump fluid. A thrust disk 7 towards the top of gland plate 1 helps support the fluid load, disposed between stationary seal ring 27 and bushing section 26 of gland plate 1. Thrust disk 7 aids as an anti-rotation device for the stationary seal face 6 and the lug drive design reduces stress on faces during upset conditions and heavy torque loads. End pin 9 is the coupling member for the thrust disk 2 and bushing section 26.

The stationary subassembly 20 is for attachment to the stuffing box or casing of the pump (not shown). Stationary subassembly 20 includes gland 1, which has a front face 1c and a back face 1b and a gland lip 28 extending from the back face 1b. Stationary subassembly 20 defines inner seal cavity 25 sealed in part by tertiary o-ring 14 disposed between the front face 1c of gland plate 1 and stationary seal ring 27 of gland plate 1. Stationary seal ring 27 has stationary face 6 sealing against sleeve 7 as shown. Back up ring 8 is adjacent to tertiary o-ring 14 to aid in sealing off inner seal cavity 25, especially upon wear of tertiary o-ring 14. Upshaft, gland plate 1 is fastened to stuffing box (not shown) and can be preset using drive screws 12. Setting clip 10 fixes the gland 1 upon locating. Setting clip 10 is placed over gland lip 28 which integrally extends axially from gland 1 as shown.

A lip seal 19 is formed under gland 1 adjacent to bushing section 26. As shown, lip seal 19 is cup-shaped in cross-section forming an annular pocket 34. Lip seal 19 is a close-fit tolerance seal preferably made of the flouro-rubber FKM. FKM lip seal 19 prevents lubricant from leaking out from the seal 1a. Lip seal 19 also acts as a secondary lubricant contained in the seal 1a. A circlip 18 is disposed behind lip seal 19 within gland 1 under gland lip 28 as shown (and thus below setting clip 10). Circlip 18 prevents the lip seal 19 from coming unseated.

Drive collar 2 is at upshaft end 23 designed to fit around shaft 30, set by flat head set screw 11. Drive collar 2 maintains the sealing relationship of sealing face 19a under lip seal 19 by, in part, prohibiting axial movement, pressing against spring 17 to impart the axial load against stationary face 6.

Now downshaft (downshaft end 22), circumferentially disposed scroll 4, also termed herein contra-flow scroll 4, is a close-tolerance machined retainer crimped onto the downshaft end 22 of rotary subassembly 21 using set screw 29. The distal end 4a of scroll 4 overlaps L-seat annular 24 as shown. Outer surface 4b of the scroll 4 is formed with intermittent peaks and valleys, i.e. notched, arranged in a spiraling fashion around the x-axis, thereby forming a spirally-arranged, ridged outer surface 4b. The scroll 4 acts as a fluid retainer and changes the environment by creating a low-pressure area 33 upshaft therefrom around the respective seal faces. More particularly, the scroll 4 is crimped onto the sleeve 3 of the rotary subassembly 21 and has a notched (or ridged) outer surface 4b spirally-arranged on its outer diameter (O.D.) to draw fluid away from the seal faces, thereby drawing a vacuum from the fluid thereon and creating a low pressure area 33. Allowing for the operation at low differential pressures optimizes seal life.

A lubricant system (not shown) provides external lubrication through quench port 32. Depending on the seal application, the lubricant is a clean external fluid selected from the group consisting of silicone oil, mineral oil, propylene glycol and isopropyl alcohol. The lubricant (not shown) in combination with the lip seal 19 maximizes lubrication supply.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A mechanical seal, comprising:
    a rotary subassembly, said rotary subassembly including a sleeve, said sleeve packed against and adapted to be in sealing disposition with a pump shaft of a pump;
    a stationary subassembly for attachment to a stuffing box of said pump, said stationary subassembly including a gland, said gland having a front face and a back face and a gland lip extending axially from said back face;
    a setting clip over said gland lip;
    a lip seal disposed within said gland at said back face below said gland lip, wherein said lip seal prevents lubricant leakage, and wherein said lip seal concurrently acts as a secondary lubricant within said seal; and,
    a circlip disposed behind said lip seal below said gland lip and below said setting clip to retain said lip seal within said gland.

2. The mechanical seal of claim 1, wherein said lip seal consists of FKM.

3. The mechanical seal of claim 1, further comprising an L-seat annular formed at a downshaft end of said gland, thereby providing a rotary sealing face between said rotary subassembly and said stationary subassembly.

4. The mechanical seal of claim 3, further comprising a secondary o-ring seated within said L-seat annular at said rotary sealing face.

5. The mechanical seal of claim 4, further comprising a back-up ring adjacent to said tertiary o-ring to aid in sealing off an inner seal cavity.

6. The mechanical seal of claim 1, further comprising a primary o-ring inverted within said sleeve in sealing disposition between said shaft and said rotary subassembly.

7. The mechanical seal of claim 1, wherein said stationary subassembly further comprises: a stationary seal ring; a spring abutting said stationary seal ring; and, a tertiary o-ring disposed between said back face of said gland plate and said stationary seal ring.

8. The mechanical seal of claim 1, wherein said lip seal is cup-shaped in cross-section forming an annular pocket.

* * * * *